United States Patent
Weng et al.

(10) Patent No.: US 11,360,555 B2
(45) Date of Patent: Jun. 14, 2022

(54) SYSTEMS AND METHODS FOR AUTOMATIC EYE GAZE REFINEMENT

(71) Applicant: CyberLink Corp., Shindian (TW)

(72) Inventors: SiPin Weng, Tainan (TW);
Sheng-Xiang Chen, Kaohsiung (TW);
Chung Ren Yan, Taoyuan (TW)

(73) Assignee: CYBERLINK CORP., Taipei (TW)

( * ) Notice: Subject to any disclaimer, the term of this patent is extended or adjusted under 35 U.S.C. 154(b) by 163 days.

(21) Appl. No.: 16/874,206

(22) Filed: May 14, 2020

(65) Prior Publication Data

US 2020/0371586 A1    Nov. 26, 2020

Related U.S. Application Data

(60) Provisional application No. 62/849,999, filed on May 20, 2019.

(51) Int. Cl.
| | | |
|---|---|---|
| *G06F 3/01* | (2006.01) | |
| *G06K 9/00* | (2022.01) | |
| *G06T 3/00* | (2006.01) | |
| *G06T 7/73* | (2017.01) | |
| *G06V 40/16* | (2022.01) | |
| *G06V 40/18* | (2022.01) | |

(52) U.S. Cl.
CPC ............ *G06F 3/013* (2013.01); *G06T 3/0093* (2013.01); *G06T 7/74* (2017.01); *G06V 40/171* (2022.01); *G06V 40/193* (2022.01); *G06T 2207/30041* (2013.01)

(58) Field of Classification Search
CPC .. G06F 3/013; G06K 9/00281; G06K 9/0061; G06T 2207/30041; G06T 2207/30201; G06T 3/0093; G06T 7/73; G06T 7/74
See application file for complete search history.

(56) References Cited

U.S. PATENT DOCUMENTS

| | | |
|---|---|---|
| 6,771,303 B2 | 8/2004 | Zhang et al. |
| 6,806,898 B1 | 10/2004 | Toyama et al. |
| 8,670,019 B2 | 3/2014 | Byers |
| 8,836,777 B2 | 9/2014 | Mehra |

(Continued)

FOREIGN PATENT DOCUMENTS

| | | |
|---|---|---|
| CN | 103345619 A | 10/2013 |
| WO | 2016/101505 A1 | 6/2016 |

OTHER PUBLICATIONS

Wood, E., et al.; "GazeDirector: Fully Articulated Eye Gaze Redirection in Video;" https://arxiv.org/pdf/1704.08763.pdf; Apr. 2017; pp. 1-10.

(Continued)

*Primary Examiner* — Afroza Chowdhury
(74) *Attorney, Agent, or Firm* — McClure, Qualey & Rodack, LLP (57) ABSTRACT

A computing device having a front-facing camera applies facial landmark detection and identifies eye regions in the digital image responsive to the front-facing camera capturing a digital image of an individual. For at least one of the eye regions, the computing device is further configured to extract attributes of the eye region, determine an eye gaze score based on the extracted attributes, generate a modified eye region based on the eye gaze score, and output a modified digital image with the modified eye region.

15 Claims, 8 Drawing Sheets

(56) References Cited

U.S. PATENT DOCUMENTS

| | | | |
|---|---|---|---|
| 8,908,008 B2 | 12/2014 | Tan et al. | |
| 8,957,943 B2 | 2/2015 | Nourbakhsh | |
| 9,141,875 B2 | 9/2015 | Wolf et al. | |
| 9,288,388 B2 | 3/2016 | Son et al. | |
| 9,300,916 B1 | 3/2016 | Breedvelt et al. | |
| 9,684,953 B2 | 6/2017 | Kuster et al. | |
| 9,740,938 B2 | 8/2017 | Nilsson et al. | |
| 2013/0222644 A1* | 8/2013 | Son | G06K 9/00248 348/239 |
| 2017/0195662 A1 | 7/2017 | Sommerlade et al. | |
| 2017/0308734 A1 | 10/2017 | Chalom et al. | |
| 2019/0244274 A1* | 8/2019 | Chang | G06Q 30/0641 |

OTHER PUBLICATIONS

Ganin, Y., et al.; "DeepWarp: Photorealistic Image Resynthesis for Gaze Manipulation;" Skoltech; http://www.eccv2016.org/files/posters/P-1B-24.pdf.

Choi, J., et al.; "Human Attention Estimation for Natural Images: An Automatic Gaze Refinement Approach;" IEEE; Jan. 2016; pp. 1-12.

Regenbrecht, H , et al.; "Mutual Gaze Support in Videoconferencing Reviewed;" Communications of the Association for Information Systems; vol. 37; Article 45; Nov. 2015; pp. 965-989.

Shu, Z., et al.; "EyeOpener: Editing Eyes in the Wild;" ACM Transactions on Graphics; vol. 36; No. 1; Article 1; Sep. 2016; pp. 1-13.

Wang, K., et al.; "A Hierarchical Generative Model for Eye Image Synthesis and Eye Gaze Estimation;" pp. 1-9.

Dong, H., et al.; "Soft-GatedWarping-GAN for Pose-Guided Person Image Synthesis;" 32nd Conference on Neural Information Processing Systems; pp. 1-11.

Yip, B.; "Eye Contact Rectification in Video Conference With Monocular Camera;" Mar. 2007; pp. 1-283.

Kononenko, D.; "Learnable Warping-Based Approach To Image Re-Synthesis With Application to Gaze Redirection;" 2017; pp. 1-131.

* cited by examiner

SYSTEMS AND METHODS FOR
AUTOMATIC EYE GAZE REFINEMENT

CROSS-REFERENCE TO RELATED APPLICATION

This application claims priority to, and the benefit of, U.S. Provisional Patent Application entitled, "Automatic Method for Eye Gaze Refinement," having Ser. No. 62/849,999, filed on May 20, 2019, which is incorporated by reference in its entirety.

TECHNICAL FIELD

The present disclosure generally relates to systems and methods for performing automatic eye gaze refinement when taking selfie photos.

BACKGROUND

With the proliferation of smartphones, people commonly capture selfie photos. Although most smartphones are equipped with front-facing cameras where users are able to view themselves on the display when taking a selfie, the user's eyes may be fixed on the user's face shown in the display rather than on the front-facing camera. Also, the user's eyes may be inadvertently half opened or completely closed while taking a selfie. Thus, in many instances, the user is not gazing in the direction of the front-facing camera, thereby resulting in selfies where the user's eyes are not centered on the front-facing camera.

SUMMARY

In accordance with one embodiment, a computing device having a front-facing camera applies facial landmark detection and identifies eye regions in the digital image responsive to the front-facing camera capturing a digital image of an individual. For at least one of the eye regions, the computing device is further configured to extract attributes of the eye region, determine an eye gaze score based on the extracted attributes, generate a modified eye region based on the eye gaze score, and output a modified digital image with the modified eye region Another embodiment is a system that comprises a front-facing camera, a memory storing instructions, and a processor coupled to the memory. The processor is configured to apply facial landmark detection and identify eye regions in the digital image responsive to the front-facing camera capturing a digital image of an individual. For at least one of the eye regions, the processor is further configured to extract attributes of the eye region, determine an eye gaze score based on the extracted attributes, generate a modified eye region based on the eye gaze score, and output a modified digital image with the modified eye region.

Another embodiment is a non-transitory computer-readable storage medium storing instructions to be implemented by a computing device having a front-facing camera and a processor, wherein the instructions, when executed by the processor, cause the processor apply facial landmark detection and identify eye regions in the digital image responsive to the front-facing camera capturing a digital image of an individual. For at least one of the eye regions, the processor is further configured to extract attributes of the eye region, determine an eye gaze score based on the extracted attributes, generate a modified eye region based on the eye gaze score, and output a modified digital image with the modified eye region.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Although users are typically able to view themselves on the display of a smartphone when taking a selfie using a front-facing camera, the user's eyes may be fixed on the user's face shown in the display rather than on the front-facing camera. Also, the user's eyes may be inadvertently half opened or completely closed while taking a selfie. This may occur, for example, if the user is outside facing the sun when taking a selfie. Thus, many times the user is not gazing in the direction of the front-facing camera, thereby resulting in selfies where the user's eyes are not centered on the front-facing camera. Various embodiments are disclosed for performing automatic eye gaze refinement for selfie images.

Figure 1:
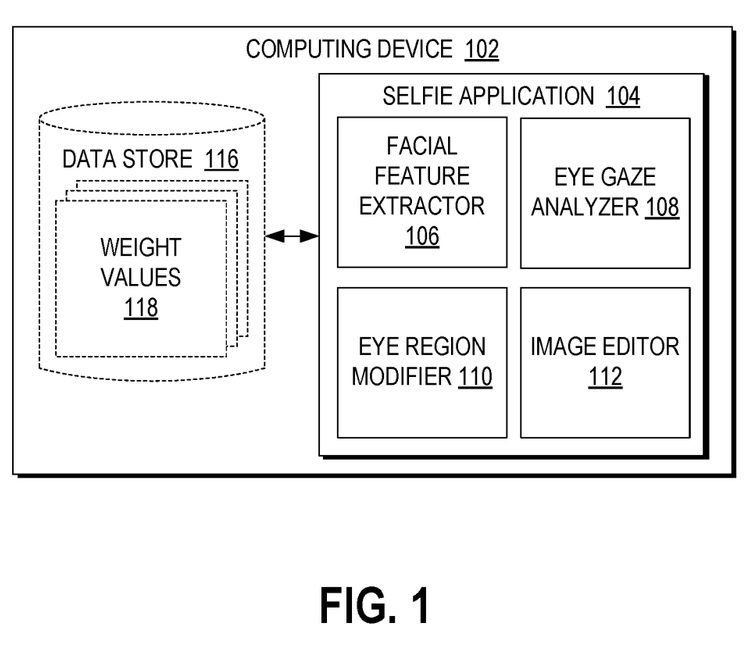
FIG. 1 is a block diagram of a computing device for performing automatic eye gaze refinement in accordance with various embodiments of the present disclosure.

A description of a system for performing automatic eye gaze refinement for selfie images is now described followed by a discussion of the operation of the components within the system. FIG. 1 is a block diagram of a computing device 102 in which techniques for performing automatic eye gaze refinement disclosed herein may be implemented. The computing device 102 may be embodied as a computing device such as, but not limited to, a smartphone, a tablet computing device, a laptop, and so on.

A selfie application 104 executes on a processor of the computing device 102 and includes a facial feature extractor 106, an eye gaze analyzer 108, an eye region modifier 110, and an image editor 112. The facial feature extractor 106 is configured to determine whether a front-facing camera captures a digital image of an individual (i.e., a selfie). Responsive to the front-facing camera capturing a digital image of an individual, the facial feature extractor 106 applies facial landmark detection and identifies both the left and right eye regions in the digital image of the individual.

As one of ordinary skill will appreciate, the digital image may be encoded in any of a number of formats including, but not limited to, JPEG (Joint Photographic Experts Group) files, TIFF (Tagged Image File Format) files, PNG (Portable Network Graphics) files, GIF (Graphics Interchange Format) files, BMP (bitmap) files or any number of other digital formats. Alternatively, the digital image may be derived from a still image of a video encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The eye gaze analyzer 108 is configured to extract attributes of one of the eye regions (either the left eye region or the right eye region) and determine an eye gaze score based on the extracted attributes. For some embodiments, the eye gaze analyzer 108 randomly selects either the left eye region or the right eye region to analyze first, where the other eye region is later analyzed.

If the eye gaze analyzer 108 determines that the first randomly selected eye region does not need to be modified based on the eye gaze score, the eye gaze analyzer 108 then analyzes the other eye region to determine whether any modifications are needed. Note that in some instances, it may be necessary for only one eye region to undergo modification whereas in other instances, it may be necessary for both eye regions to be modified. If both eyes are gazing in the direction of the front-facing camera, then no modification is performed.

For some embodiments, the eye gaze analyzer 108 extracts attributes of the eye region by identifying a lower eyelid and an upper eyelid for each eye in the selfie image. The eye gaze analyzer 108 then generates a first coefficient based on a curvature of the lower eyelid. The eye gaze analyzer 108 also generates a second coefficient based on a curvature of the upper eyelid.

The eye gaze analyzer 108 then generates an eye gaze score based on the first and second coefficients. For some embodiments, the eye gaze analyzer 108 determines the eye gaze score based on the first and second coefficients by retrieving weight values 118 from a data store 116 and generating weighted first and second coefficients. The eye gaze analyzer 108 then determines the eye gaze score based on the weighted first and second coefficients, as described in more detail below.

The eye region modifier 110 is configured to generate a modified eye region based on the eye gaze score. Once the first eye region is modified, the eye region modifier 110 is further configured to automatically determine whether to modify the other eye region. For example, if the eye region modifier 110 first modifies the left eye region, the steps described above may be repeated for the other eye region (the right eye region) such that both the left and right eye regions are modified as needed. The image editor 112 is configured to output a modified digital image depicting each of the modified eye regions, where the modified digital image depicts both of the individual's eyes gazing in the direction of the front-facing camera.

Figure 2:
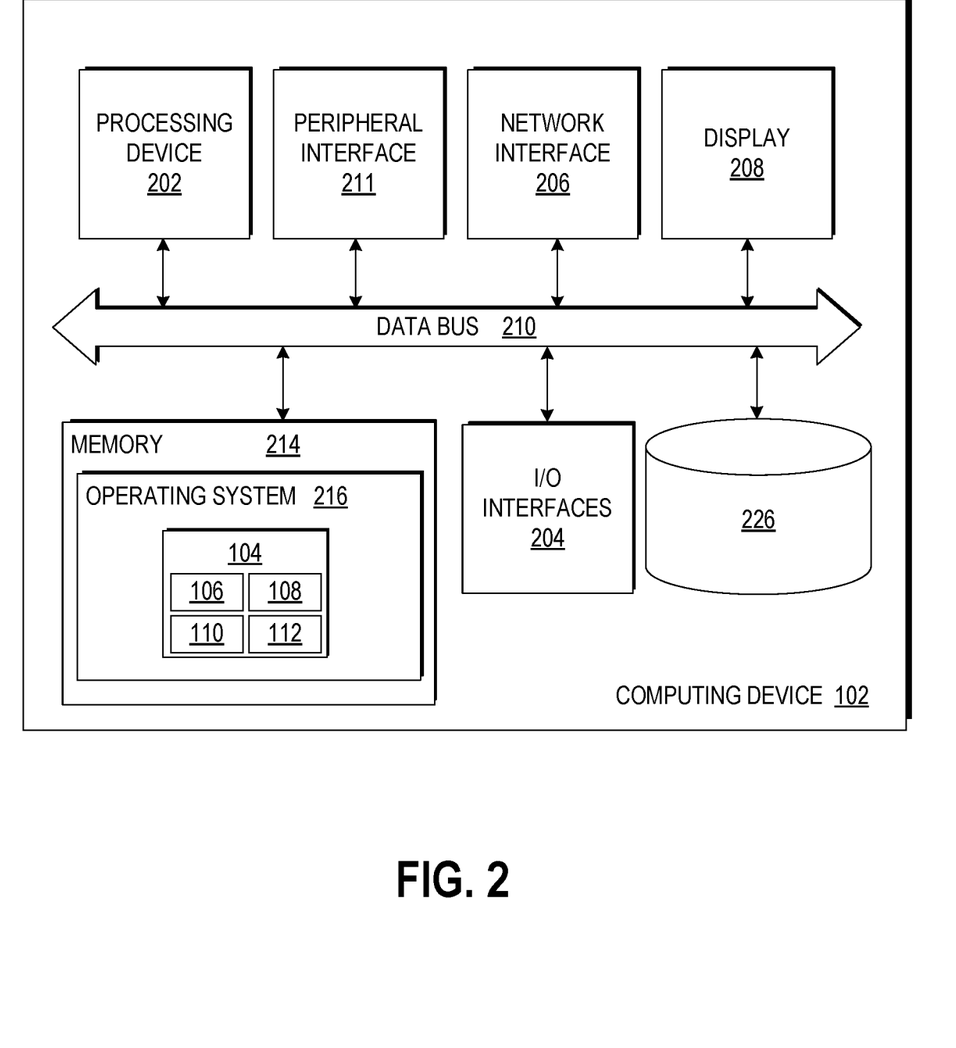
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied in any one of a wide variety of wired and/or wireless computing devices, such as a desktop computer, portable computer, dedicated server computer, multiprocessor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include any custom made or commercially available processor, a central processing unit (CPU) or an auxiliary processor among several processors associated with the computing device 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 may include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 depicted in FIG. 1. In accordance with such embodiments, the components are stored in memory 214 and executed by the processing device 202, thereby causing the processing device 202 to perform the operations/functions disclosed herein. One of ordinary skill in the art will appreciate that the memory 214 can, and typically will, comprise other components which have been omitted for purposes of brevity. For some embodiments, the components in the computing device 102 may be implemented by hardware and/or software.

Input/output interfaces 204 provide any number of interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
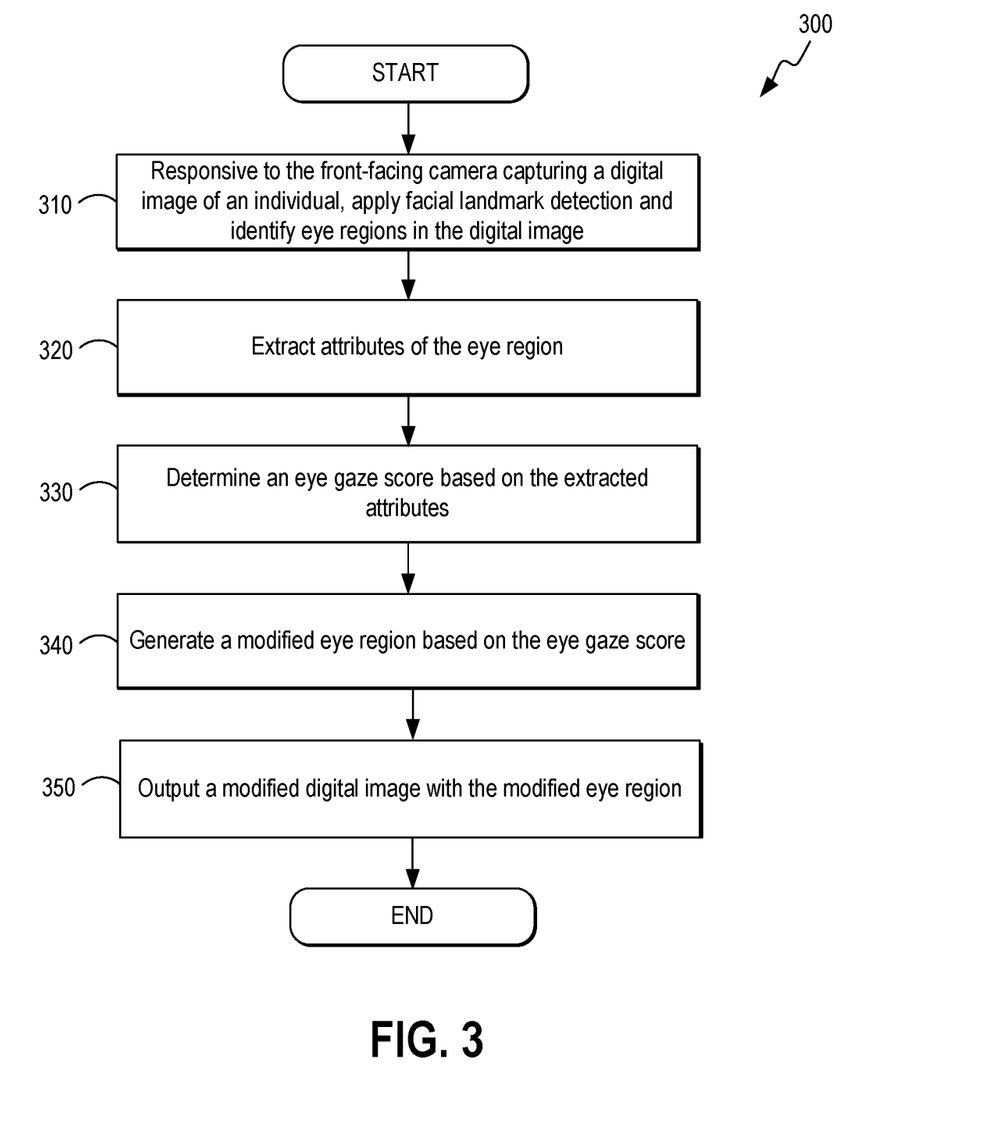
FIG. 3 is a top-level flowchart illustrating examples of functionality implemented as portions of the computing device of FIG. 1 for performing automatic eye gaze refinement according to various embodiments of the present disclosure.

Reference is made to FIG. 3, which is a flowchart 300 in accordance with various embodiments for automatic eye gaze refinement performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the computing device 102 determines whether a front-facing camera captures a digital image of an individual. Responsive to the front-facing camera capturing a digital image of an individual, the computing device 102 performs facial landmark detection and identifies an eye region from the digital image of the individual. The operations described in connection with blocks 320 to 350 below are performed for at least one of the eye regions At block 320, the computing device 102 extracts attributes of the eye region. At block 330, the computing device 102 determines an eye gaze score based on the extracted attributes. For some embodiments, the computing device 102 determines the eye gaze score based on the extracted attributes by identifying a lower eyelid and an upper eyelid. The computing device 102 then generates a first coefficient based on a curvature of the lower eyelid. The computing device 102 also generates a second coefficient based on a curvature of the upper eyelid. The computing device 102 then determines the eye gaze score based on the first and second coefficients.

For some embodiments, the computing device 102 determines the eye gaze score based on the first and second coefficients by retrieving weight values 118 (FIG. 1) from a data store 116 (FIG. 1) and generating weighted first and second coefficients. The computing device 102 then determines the eye gaze score based on the weighted first and second coefficients. For some embodiments, the computing device 102 generates a modified eye region by determining a warping vector based on the second coefficient and then adjusting the curvature of the upper eyelid for each eye based on the warping vector. For some embodiments, the computing device 102 generates a modified eye region by adjusting a direction of a pupil with respect to the front-facing camera, a size of the pupil, a shape of the pupil, or any combination thereof.

At block 340, the computing device 102 generates a modified eye region based on the eye gaze score. For some embodiments, the computing device 102 generates the modified eye region based on the eye gaze score by determining a direction of an eye gaze with respect to the front-facing camera based on the eye gaze score and warping a pupil in the eye region to modify the direction of the eye gaze while maintaining an original curvature of the pupil. At block 350, the computing device 102 outputs a modified digital image with the modified eye region. Thereafter, the process in FIG. 3 ends.

Figure 4:
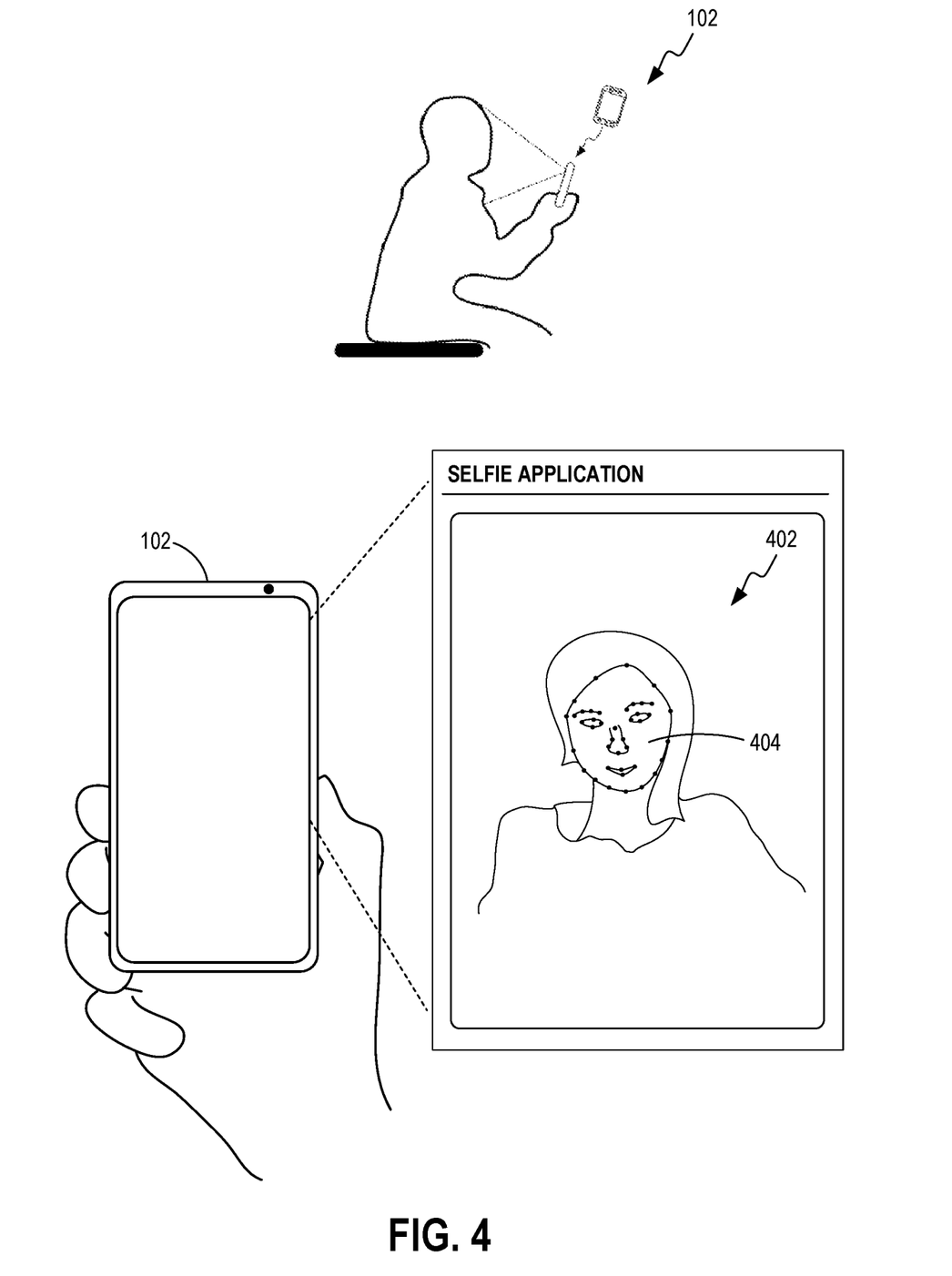
FIG. 4 illustrates application of a facial landmark detection algorithm by the computing device in FIG. 1 according to various embodiments of the present disclosure.

Reference is made to FIG. 4, which illustrates application of a facial landmark detection algorithm for identifying eye regions in a digital image 402 in accordance with various embodiments. When the front-facing camera of the computing device 102 captures a digital image 402, a facial landmark detection algorithm is applied by the computing device 102 to extract attributes of the eye regions by identifying the locations of key landmark points on the facial region 404 depicted in the digital image 402. Such key landmark points may comprise dominant points describing the unique location of facial components (e.g., eye corner) or an interpolated point connecting those dominant points around the facial components and facial curvature.

Figure 5:
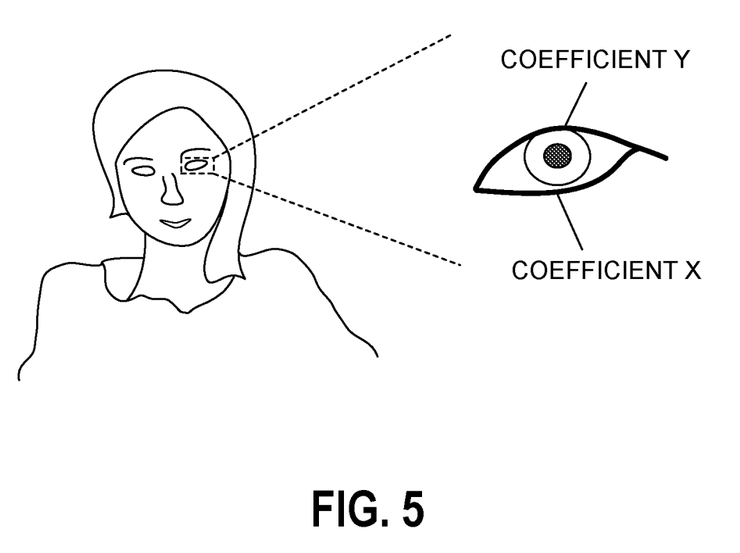
FIG. 5 illustrates coefficients derived by the computing device in FIG. 1 based on extracted attributes relating to a first eye region according to various embodiments of the present disclosure.

FIG. 5 illustrates coefficients derived based on extracted attributes relating to a first eye region (e.g., the left eye region) in accordance with various embodiments. These coefficients are then utilized to determine an eye gaze score to determine whether further processing of the eye region is needed. For some embodiments, an eye gaze algorithm is executed by the eye gaze analyzer 108 in the computing device 102 (FIG. 1) to generate an eye gaze score based on the extracted attributes relating to the eye region. The eye gaze score is indicative of the degree in which the individual's eyes are open and serves as an indicator of whether the individual is gazing in the direction of the front-facing camera of the computing device 102.

As shown in FIG. 5, the eye gaze algorithm measures the curvature of both the lower eyelid and the upper eyelid, where a coefficient (x) is associated with the curvature of the lower eyelid and a coefficient (y) is associated with the upper eyelid. The eye gaze algorithm then assigns an eye gaze score based on the following relationships. For some embodiments, if the relationship $\alpha x < y < \beta x$ is true, then the eye gaze algorithm assigns a value of 3. This signifies that the user's eyes are open and that the user is gazing in the direction of the front-facing camera of the computing device 102, as shown in FIG. 5. Therefore, no further processing is required.

Figure 6:
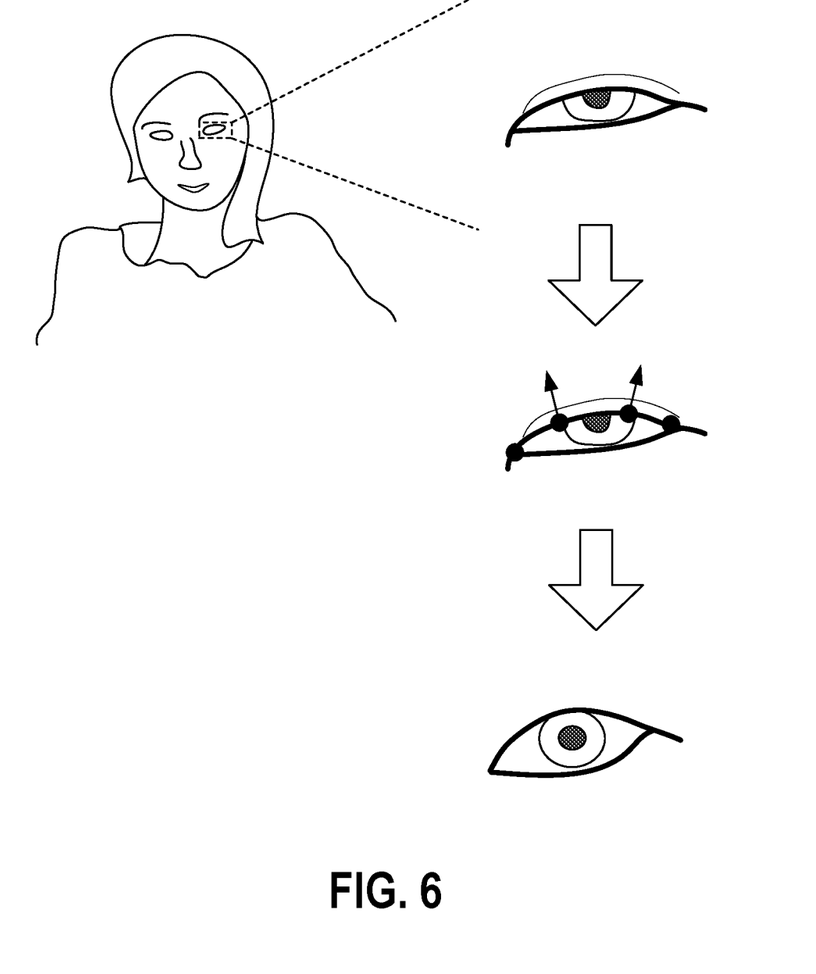
FIG. 6 illustrates a scenario where an eye gaze score is assigned when the user's eyes are partially closed according to various embodiments of the present disclosure.

If the eye gaze algorithm determines that the relationship $\alpha x > y$ applies to the current digital image, the eye gaze algorithm assigns a value of 1. As shown in FIG. 6, an eye gaze score of 1 signifies that the user's eyes are partially closed and that the user's eyes are not gazing in the direction of the front-facing camera of the computing device 102. Therefore further processing is required. Specifically, a warping operation is then applied by the eye region modifier 110 (FIG. 1), whereby inner points of the upper eyelid are moved in an upward direction such that the value of coefficient y is adjusted until the relationship $\alpha x < y < \beta x$ is met.

Figure 7:
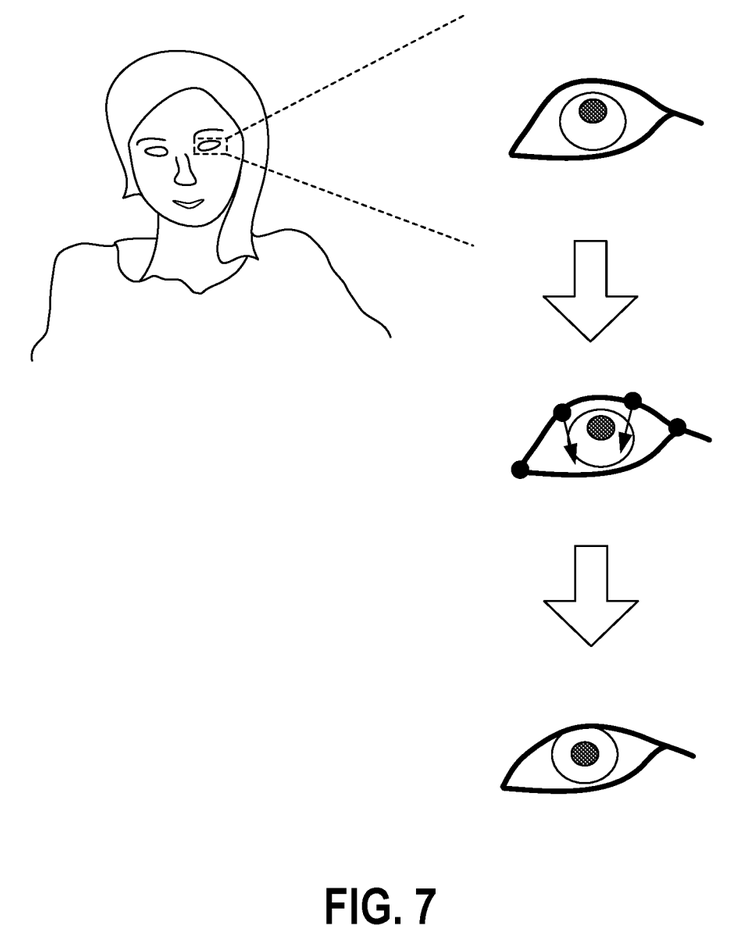
FIG. 7 illustrates a scenario where an eye gaze score is assigned when the user's eyes open too wide according to various embodiments of the present disclosure

If the eye gaze algorithm determines that the relationship $\beta x < y$ applies to the digital image, the eye gaze algorithm assigns a value of 2. As shown in FIG. 7, an eye gaze score of 2 signifies that the user's eyes are open too wide and that the user's eyes are not gazing in the direction of the front-facing camera of the computing device 102. Therefore, further processing is required. Again, a warping operation is then applied by the eye region modifier 110 (FIG. 1), whereby inner points of the upper eyelid are moved in a downward direction such that the value of coefficient y is adjusted until the relationship $\alpha x < y < \beta x$ is met.

Figure 8:
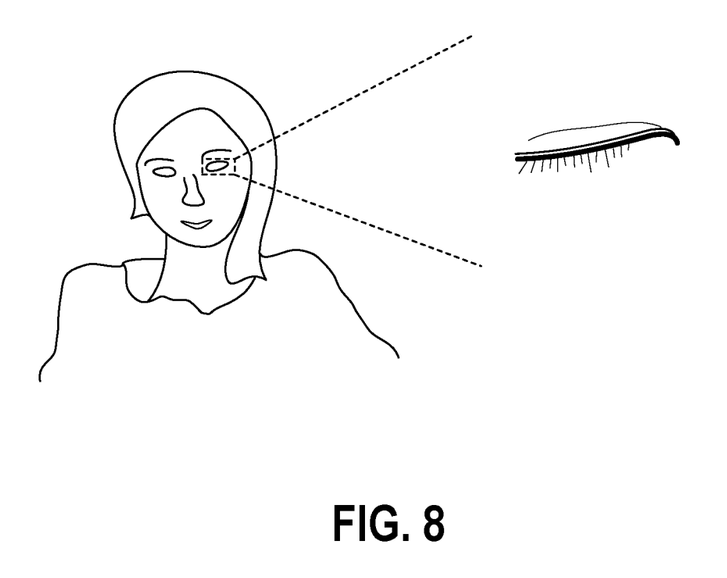
FIG. 8 illustrates a scenario where an eye gaze score is assigned when the user's eyes are completely closed according to various embodiments of the present disclosure.

If the eye gaze algorithm determines that $\tau X > y$ and $\alpha > \tau$ apply to the digital image, the eye gaze algorithm assigns a value of 4. As shown in FIG. 8, an eye gaze score of 4 signifies that the user's eyes are completely closed. As a warping operation will not be effective in this scenario, no further processing is performed and the digital image is discarded. In the expressions above, the variables $\alpha$, $\beta$, and $\tau$ are weight values 118 (FIG. 1) that may be empirically derived and retrieved from a data store 116 (FIG. 1). As discussed earlier, once the first eye region is modified, the other eye region is automatically analyzed to determine whether the other eye region needs to be modified. For example, if the left eye region is first modified, the steps described above are automatically repeated for the other eye region (the right eye region) such that both the left and right eye regions are modified as needed.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A method implemented in a computing device having a front-facing camera, comprising:
    responsive to the front-facing camera capturing a digital image of an individual, applying facial landmark detection and identifying eye regions in the digital image;
    for at least one of the eye regions, performing the steps of:
    extracting attributes of the eye region;
    determining an eye gaze score based on the extracted attributes;
    generating a modified eye region based on the eye gaze score, wherein generating the modified eye region comprises adjusting at least one of: a direction of a pupil with respect to the front-facing camera, a size of the pupil, and a shape of the pupil; and
    outputting a modified digital image with the modified eye region.

2. The method of claim 1, wherein determining the eye gaze score based on the extracted attributes comprises:
    identifying a lower eyelid and an upper eyelid;
    generating a first coefficient based on a curvature of the lower eyelid;
    generating a second coefficient based on a curvature of the upper eyelid; and
    determining the eye gaze score based on the first and second coefficients.

3. The method of claim 2, wherein determining the eye gaze score based on the first and second coefficients comprises:
    retrieving weight values from a data store and generating weighted first and second coefficients; and
    determining the eye gaze score based on the weighted first and second coefficients.

4. The method of claim 2, wherein generating the modified eye region comprises:
    determining a warping vector based on the second coefficient; and
    adjusting the curvature of the upper eyelid based on the warping vector.

5. A method implemented in a computing device having a front-facing camera, comprising:
    responsive to the front-facing camera capturing a digital image of an individual, applying facial landmark detection and identifying eye regions in the digital image;
    for at least one of the eye regions, performing the steps of:
    extracting attributes of the eye region;
    determining an eye gaze score based on the extracted attributes;
    generating a modified eye region based on the eye gaze score, wherein generating the modified eye region based on the eye gaze score comprises:
        determining a direction of an eye gaze with respect to the front-facing camera based on the eye gaze score; and
        warping a pupil in the eye region to modify the direction of the eye gaze while maintaining an original curvature of the pupil; and
    outputting a modified digital image with the modified eye region.

6. A system, comprising:
    a front-facing camera;
    a memory storing instructions;
    a processor coupled to the memory and configured by the instructions to at least:
        responsive to the front-facing camera capturing a digital image of an individual, apply facial landmark detection and identifying eye regions in the digital image;
        for at least one of the eye regions, the processor is further configured to:
        extract attributes of the eye region;
        determine an eye gaze score based on the extracted attributes;
        generate a modified eye region based on the eye gaze score,
        wherein the processor is configured to generate the modified eye region by adjusting at least one of: a direction of a pupil with respect to the front-facing camera, a size of the pupil, and a shape of the pupil; and
        output a modified digital image with the modified eye region.

7. The system of claim 6, wherein the processor is configured to determine the eye gaze score based on the extracted attributes by:
    identifying a lower eyelid and an upper eyelid;
    generating a first coefficient based on a curvature of the lower eyelid;
    generating a second coefficient based on a curvature of the upper eyelid; and
    determining the eye gaze score based on the first and second coefficients.

8. The system of claim 7, wherein the processor is configured to determine the eye gaze score based on the first and second coefficients by:
    retrieving weight values from a data store and generating weighted first and second coefficients; and
    determining the eye gaze score based on the weighted first and second coefficients.

9. The system of claim 7, wherein the processor is configured to generate the modified eye region by:
    determining a warping vector based on the second coefficient; and adjusting the curvature of the upper eyelid based on the warping vector.

10. A system, comprising:
a front-facing camera;
a memory storing instructions;
a processor coupled to the memory and configured by the instructions to at least:
responsive to the front-facing camera capturing a digital image of an individual, apply facial landmark detection and identifying eye regions in the digital image;
for at least one of the eye regions, the processor is further configured to:
extract attributes of the eye region;
determine an eye gaze score based on the extracted attributes;
generate a modified eye region based on the eye gaze score, wherein the processor is configured to generate the modified eye region based on the eye gaze score by determining a direction of an eye gaze with respect to the front-facing camera based on the eye gaze score and warping a pupil in the eye region to modify the direction of the eye gaze while maintaining an original curvature of the pupil; and
output a modified digital image with the modified eye region.

11. A non-transitory computer-readable storage medium storing instructions to be implemented by a computing device having a front-facing camera and a processor, wherein the instructions, when executed by the processor, cause the computing device to at least:
responsive to the front-facing camera capturing a digital image of an individual, apply facial landmark detection and identifying eye regions in the digital image;
for at least one of the eye regions, the processor is further configured to:
extract attributes of the eye region;
determine an eye gaze score based on the extracted attributes;
generate a modified eye region based on the eye gaze score, wherein the processor is configured to generate the modified eye region by adjusting at least one of:
a direction of a pupil with respect to the front-facing camera, a size of the pupil, and a shape of the pupil; and
output a modified digital image with the modified eye region.

12. The non-transitory computer-readable storage medium of claim 11, wherein the processor is configured to determine the eye gaze score based on the extracted attributes by:
identifying a lower eyelid and an upper eyelid;
generating a first coefficient based on a curvature of the lower eyelid;
generating a second coefficient based on a curvature of the upper eyelid; and
determining the eye gaze score based on the first and second coefficients.

13. The non-transitory computer-readable storage medium of claim 12, wherein the processor is configured to determine the eye gaze score based on the first and second coefficients by:
retrieving weight values from a data store and generating weighted first and second coefficients; and
determining the eye gaze score based on the weighted first and second coefficients.

14. The non-transitory computer-readable storage medium of claim 12, wherein the processor is configured to generate the modified eye region by:
determining a warping vector based on the second coefficient; and
adjusting the curvature of the upper eyelid based on the warping vector.

15. A non-transitory computer-readable storage medium storing instructions to be implemented by a computing device having a front-facing camera and a processor, wherein the instructions, when executed by the processor, cause the computing device to at least:
responsive to the front-facing camera capturing a digital image of an individual, apply facial landmark detection and identifying eye regions in the digital image;
for at least one of the eye regions, the processor is further configured to:
extract attributes of the eye region;
determine an eye gaze score based on the extracted attributes;
generate a modified eye region based on the eye gaze score, wherein the processor is configured to generate the modified eye region based on the eye gaze score by determining a direction of an eye gaze with respect to the front-facing camera based on the eye gaze score and warping a pupil in the eye region to modify the direction of the eye gaze while maintaining an original curvature of the pupil; and
output a modified digital image with the modified eye region.

* * * * *